Dec. 11, 1962 H. T. SMITH ET AL 3,067,466
ACCESSORY FOR TIRE SHAPING AND CURING PRESSES
Filed Feb. 20, 1961 4 Sheets-Sheet 1
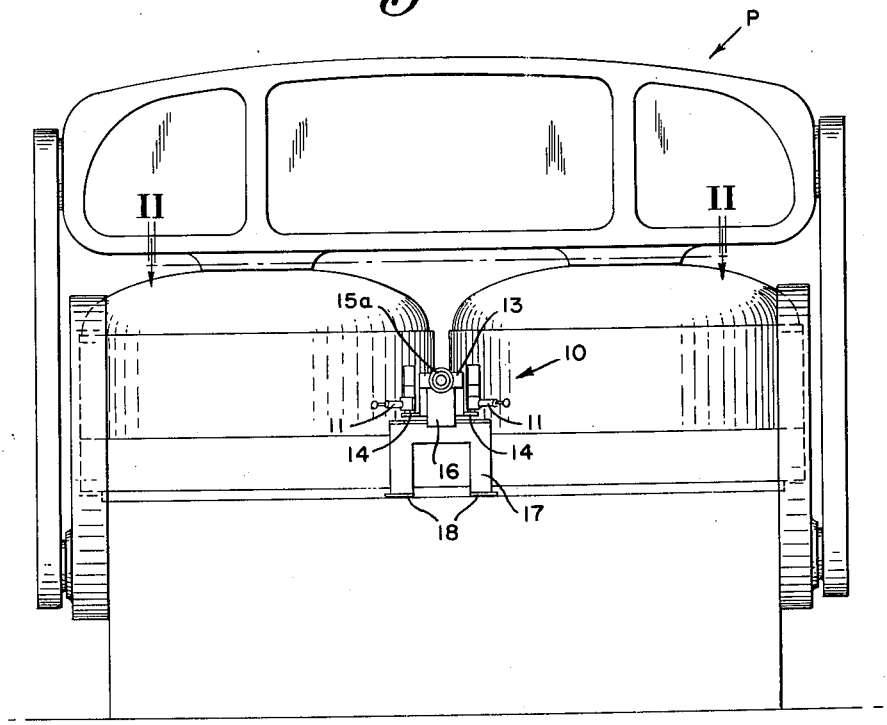
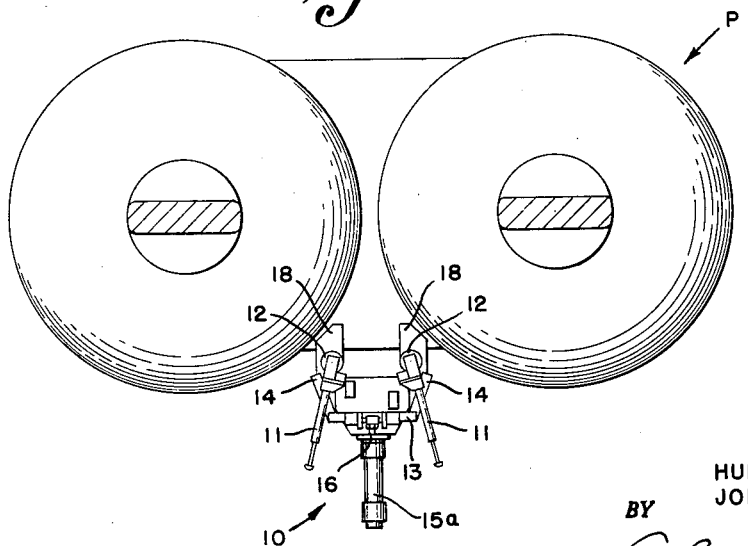
INVENTORS
HUBERT T. SMITH
JOHN K. LASH
BY
ATTORNEY.

INVENTORS
HUBERT T. SMITH
JOHN K. LASH
BY
Arthur L. Johnston
ATTORNEY.

Dec. 11, 1962 H. T. SMITH ET AL 3,067,466
ACCESSORY FOR TIRE SHAPING AND CURING PRESSES
Filed Feb. 20, 1961 4 Sheets-Sheet 3

INVENTORS
HUBERT T. SMITH
JOHN K. LASH
BY
*Arthur L. Whinston*
ATTORNEY.

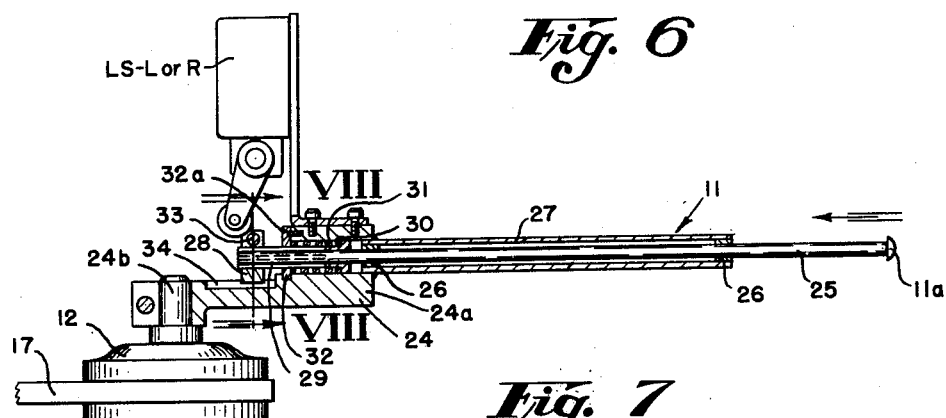
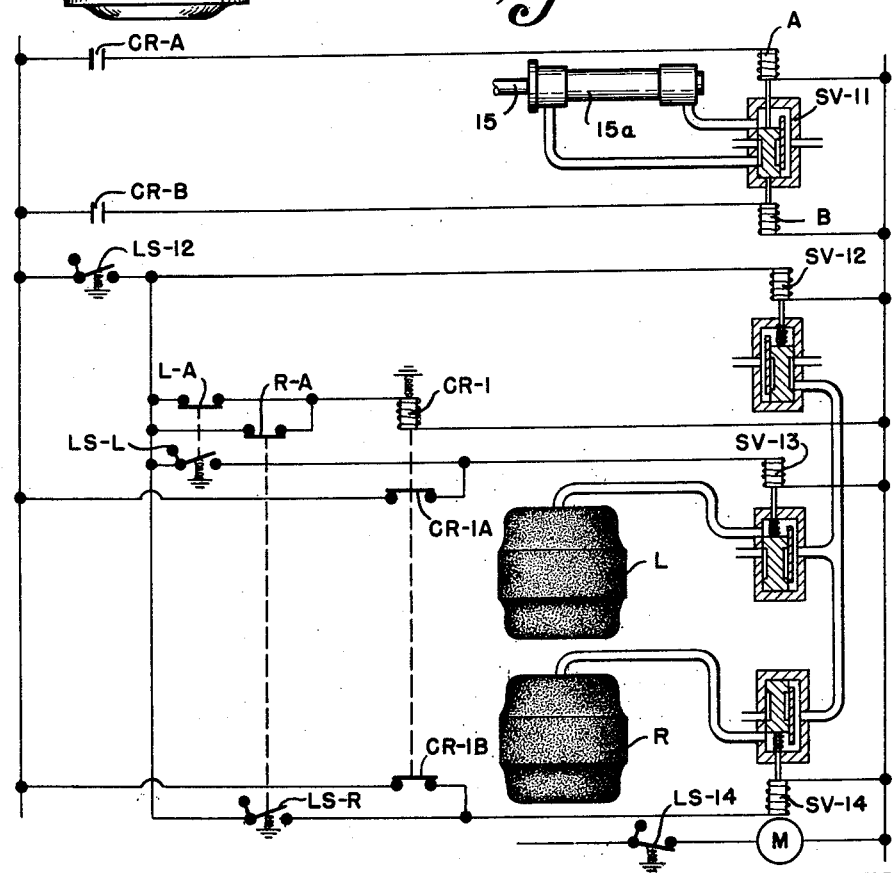

3,067,466
ACCESSORY FOR TIRE SHAPING AND
CURING PRESSES
Hubert T. Smith, St. Clair Shores, and John K. Lash, Grosse Pointe Woods, Mich., assignors to United States Rubber Company, New York, N.Y., a corporation of New Jersey
Filed Feb. 20, 1961, Ser. No. 90,280
1 Claim. (Cl. 18—17)

The present invention refers to presses for the shaping and vulcanizing of pneumatic tires. Presses of this type are characterized by the presence of an inflatable diaphragm located between the two sections of a tire mold mounted in the press. The closure of the press and the inflation of the diaphragm shape the tire. After the requisite period for the vulcanization of the tire, the press is opened, the tire stripped from the mold sections and the diaphragm removed from the tire.

Presses of this type are well-known in the tire manufacturing art. U.S. Patents Nos. 2,495,663 and 2,495,664 disclose typical examples.

The invention is also useful in presses designed for bagless curing, i.e., in presses in which the diaphragm is eliminated and the inflating medium is introduced directly into the tire carcass. Presses of this type are well known; see, for example, U.S. Patent No. 2,846,722.

The invention may also be used to advantage in dual presses having two different mold cavities for simultaneously shaping two tires of different size or shape.

The invention is shown applied to a dual type press, i.e., one in which two tires are shaped and cured at a single operation, but it may also be employed in a single type curing press. Furthermore, it is illustrated in connection with a press in which the upper mold section moves vertically with respect to the lower mold section, but the invention may also be used in presses in which the upper mold section is swung backwardly at the upper end of its opening movement and forwardly at the upper end of its closing movement.

In the operation of the press, an uncured tire band is placed in a telescoping position over the usual rubber diaphragm, resting with its lower edge on the usual bead or toe ring. As the press starts to close, the diaphragm is inflated, forcing the beads of the tire band together and pressing the uncured rubber into contact with the mold. The diaphragm, thus, effectively pre-shapes the raw tire carcass during the closing of the press.

Heretofore, there has been no control over the degree of expansion of the raw tire carcass during this shaping period, with the result that blemished or defective tires are often produced. Any number of factors can contribute to this condition. For example, the variables inherent in the raw tire carcasses themselves can cause irregular expansion. Also, in the case of dual presses, variations in the length of time that each of the curing bags has been in service, together with the actual piping of the presses themselves, can cause irregular expansion of the carcasses during the shaping period.

Variations in expansion can take the form of over-inflation or under-inflation. When over-inflation of the carcass occurs, the tire may be expanded to a point beyond the mold dimensions. When the press is then closed, a kink is forced into the crown surface of the bag and usually results in a tire that has to be scrapped. Over-inflation can also cause the curing bag to protrude between the bead and the toe ring of the press, thus causing a defective bead in the finally cured tire. Also, over-expansion can cause folds in the sidewall, which would also result in a defective tire.

Under-inflation of the raw tire carcass can be equally detrimental. If the carcass is under-inflated, when the press closes the bead area will have insufficient rotation prior to its engagement with the toe ring. This usually results in poor bead life during tire service.

It is thus an object of the present invention to provide an accessory for the type of tire shaping and curing presses herein described that will provide a means of controlling the degree of expansion of the raw tire carcass during the shaping period. It is a further object of the instant invention to provide a means of automatically subjecting both tire carcasses in a dual press to the same degree of expansion before permitting the press to close completely.

It will be appreciated that while the description of the invention and its mode of operation is shown and described in great detail, many of the details may be altered or modified without departing from the essential features of the invention as set forth in the appended claims.

In the drawings, in which the preferred form of the invention is shown in such detail as to enable those skilled in the art to understand the same:

FIG. 1 is an elevational view of the rear of a tire press of the type set forth, showing the invention attached thereto;

FIG. 2 is a plan view, partially in section, taken on line II—II of FIG. 1;

FIG. 5 is an enlarged plan view of the invention showing the contacting arms thereof engaged by two expanding tire carcasses, the dotted line portion of the view showing the arms in the inoperative position;

FIG. 6 is an enlarged sectional view through one of said arms in contact with an expanding carcass;

FIG. 7 is a combined wiring and piping diagram of the controls of the subject invention, the diagram being adapted for use with a dual press, although it must be understood that for a single type press the wiring will be on the same general principles; and FIG. 8 is a sectional view taken on line VIII—VIII of FIG. 6.

Figure 3:
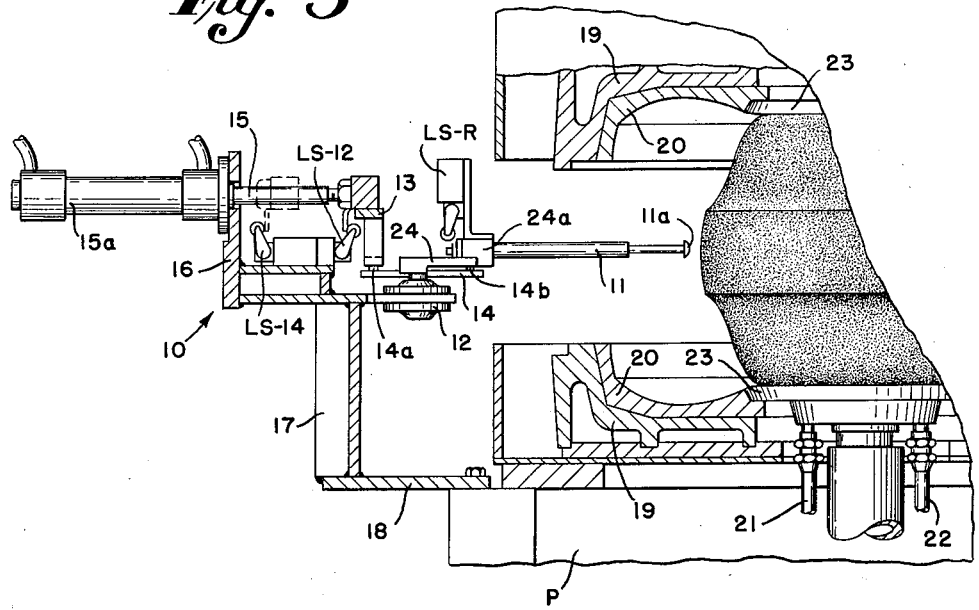
FIG. 3 is an enlarged sectional view showing the invention relative to an expanding tire carcass.

Referring to the drawings, and in particular to FIGS. 1-4, there is illustrated a dual type tire shaping and curing press P equipped with the inventive device, which is generally referred to by the numeral 10. The press shown is of the conventional steamback variety, having upper and lower steambacks 19, in which are fastened the usual mold halves 20 for curing a tire. Obviously the well known platen or dome type presses may also be used. Connections 21 and 22 (see FIGS. 3 and 4) serve to introduce the pressure medium, such as steam and/or air, for curing, while upper and lower toe rings 23 assist in clamping the bag and shaping the beads of the tire.

Briefly stated, the inventive device 10 consists of a pair of arms 11 adapted to contact the expanding tire carcasses at a predetermined point and then, by means of suitable controls, shut off the pressure medium to the carcasses, thus to prevent any further expansion. If the complete shaping of both carcasses is simultaneous, then both arms 11 will function to shut off both pressure medium supplies. However, if one carcass reaches the proper degree of expansion first, then only one valve will be closed, thus permitting the other carcass to continue to inflate until it reaches the desired condition. Also, if for any reason the first carcass loses some of its shaping pressure while waiting for the second carcass to be shaped, the proper pressure supply valve would again be opened, thus insuring that both carcasses are inflated to the proper shape before the conventional curing process can continue.

As best shown in FIGS. 2–6, the arms 11 are mounted in bearings 12 and pivotally connected to a cross-bar 13 by means of links 14 and levers 24. A piston rod 15 of a fluid cylinder 15a is suitably attached to cross-bar 13 for actuating arms 11 in and out of the open press. Cylinder 15a is attached to a vertical plate 16, which in turn is welded to a suitable supporting structure 17. Supporting structure 17 is attached to a base plate 18, which may be bolted, for example, to the base of the press P.

Forward movement of piston rod 15 moves cross-bar 13 forwardly. Links 14 pivot about points 14a and 14b (see FIGS. 3–5), rotating levers 24 about bearings 12, thus to swing arms 11 from their rearward position (as shown by the dotted lines in FIG. 5) to their forward position. The arms 11 are then adapted to engage the expanding tire carcasses, thus to control the inflation thereof.

Figure 4:
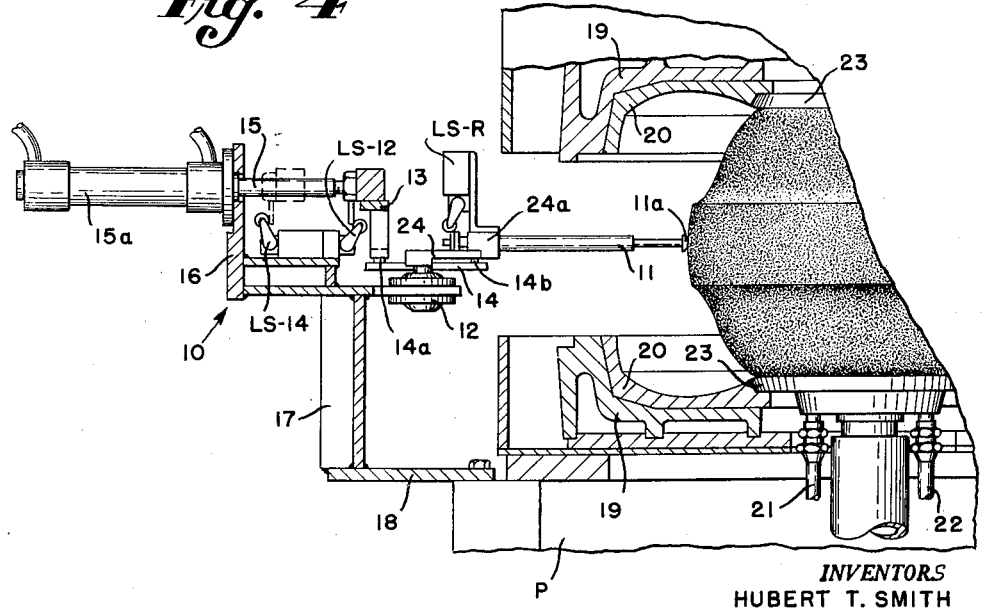
FIG. 4 is a view similar to that of FIG. 3, with the tire carcass further expanded during the shaping period and with the invention acting to stop further inflation.

FIGS. 3 and 4 show a typical condition during the closing cycle of the tire press P. The press is stopped at a predetermined position by a timer (not shown) which also serves to actuate cylinder 15a. Piston rod 15 moves forwardly, releasing a limit switch LS–14, which stops the press closing motor M (see FIG. 7). When piston rod 15a has completely rotated arms 11 to their "in" position, as above described, limit switch LS–12 is actuated to pressurize the tire carcasses for shaping.

When the tire carcasses reach the proper degree of inflation, the tips 11a of arms 11 are contacted. Pressure on tips 11a causes arms 11 to move rearwardly, thus releasing limit switches LS–L and LS–R. (See FIG. 5.) Releasing either limit switch LS–L or LS–R shuts off the respective pressure supply. When both limit switches LS–L and LS–R have been actuated, suitable controls reverse the operation of cylinder 15a, thereby retracting arms 11 to the "out" position. The press can then continue to close, thereby completing the curing process. FIG. 4 shows the tire carcass expanded for proper shaping with limit switch LS–R actuated by arm 11, thus shutting off the respective pressure supply to the carcass.

FIGS. 6 and 8 show arms 11 in greater detail. Arms 11 are attached to the enlarged ends 24a of levers 24. Levers 24 are rotatably mounted on shafts 24b in bearings 12.

Each arm 11 consists of a rod 25 slidably mounted on bearings 26 in a tube 27. A cam 28 is adjustably mounted on a splined sleeve 29 on the end of rod 25. Cam 28, being secured to rod 25 and splined sleeve 29 by means of a bolt 33, can move with rod 25, thereby to actuate limit switch LS–L or LS–R. Sleeve 29 has a shoulder 30, against which a compression spring 31 presses. The rearward end of spring 31 abuts against a spring retaining plate 32, which is attached to the enlarged end of lever 24 by means of a screw 32a.

The spring tension in spring 31 and the distance that rod 25 extends from tube 27 are adjustable by means of bolt 33 in the cam 28. When the bolt 33 is loosened, splined sleeve 29 and rod 25 can be slid in the desired direction and the cam 28 moved in the slot 34, so that the limit switches LS–L and LS–R will be released at any predetermined amount of tire carcass expansion. Tightening bolt 33 binds splined sleeve 29 to rod 25 and cam 28 to sleeve 29. (See FIG. 8.)

Spring 31 serves to reverse the movement and holds rod 25 protruded when it is not being engaged by an inflated carcass. When the expanded carcass touches tip 11a, rod 25, sleeve 29 and cam 28 are moved rearwardly (in the direction of the arrow in FIG. 6), thus to actuate the limit switches LS–L and LS–R. The slot 34 serves to limit the movement of cam 28, so that a limit switch cannot be over-run by too long a stroke when the arm 11 is actuated. When the arm 11 ceases to contact a tire carcass, spring 31 pushes the assembly forward and releases the limit switches.

In order to complete the disclosure, there is shown in FIG. 7 an illustrative wiring and piping diagram for operating the invention in connection with a dual type press. The wiring for operating the press itself, however, is not essential to an understanding of the invention involved.

The controls shown in FIG. 7 function as follows. At a predetermined position during the closing cycle of the press, normally open contacts CR–A of the press timing circuit close, thus energizing solenoid A of solenoid valve SV–11. This actuates cylinder 15a by reversing solenoid valve SV–11. Simultaneously with the above actions and due to the forward movement of piston rod 15, limit switch LS–14 opens, thereby stopping the press closing motor M.

When the arms 11 have reached the "in" position, normally open switch LS–12 is actuated, thus energizing control relay CR–1 and the solenoid of solenoid valve SV–12. Energization of solenoid SV–12 directs pressure medium through its valve to the normally open valves SV–13 and SV–14 and thence into tire carcasses L and R. The solenoids in solenoid valves SV–13 and SV–14 are still de-energized, since contacts CR–1A and CR–1B were opened when control relay CR–1 was energized.

If the expansion and proper shaping of both tire carcasses is simultaneous, then arms 11 will cause both limit switches LS–L and LS–R to close simultaneously. However, both switches LS–L and LS–R must be actuated to de-energize control relay CR–1 through the opening of normally closed contacts L–A and R–A.

If, on the other hand, tire carcass L be shaped first, then only limit switch LS–L would be actuated, thus energizing solenoid SV–13 to close the valve and stop further pressure to carcass L. In that event carcass R would continue to be inflated until it reached the proper degree of expansion and actuated limit switch LS–R. Also, if for any reason carcass L lost some of its shaping pressure while waiting for carcass R to be shaped, solenoid SV–13 would be de-energized through the deactuation of limit switch LS–L. This method of control insures that both carcasses be inflated to the proper shape and both limit switches actuated before the conventional curing processes can continue.

After both limit switches LS–L and LS–R have been actuated, control relay CR–B closes and control relay CR–A opens due to operation of the press timing circuit, thus energizing solenoid B of solenoid valve SV–11 to reverse cylinder 15a. This retracts piston 15, thus to swing arms 11 to the "out" position. At the beginning of the reverse stroke of the cylinder 15a, limit switch LS–12 is opened to de-energize solenoid SV–12, thus shutting off the pressure medium to valves SV–13 and SV–14. At the end of the reverse stroke of the cylinder, when the arms 11 are in the "out" position, limit switch LS–14 is actuated to energize the press closing motor M so that the curing process may proceed. Limit switch LS–14 is thus seen to be a safety switch, which makes sure that the arms 11 are fully retracted and out of the press closing path before operations are resumed.

We have thus disclosed a new accessory for tire shaping and curing presses which will provide effective control over the degree of expansion of the raw tire carcasses during the shaping period and will further serve to insure that both carcasses in a dual type press are subjected to the same degree of expansion before the press is permitted to close. Where the terms "upper" and "lower" mold sections are used in the specification and claim, it will be understood that these terms are relative only and that the relationship between these two sections is unimportant and may be changed.

Having thus described our invention what we claim and desire to protect by Letters Patent is:

In a dual tire press for shaping and curing two unvulcanized tire bands within two pairs of separable upper and lower mold sections, said press being adapted when open to receive a pair of uncured tire bands in registry with said lower mold sections and having inflating means for expanding said bands while closing said mold sections therearound, the improvement comprising
an expansion control mechanism mounted on the side of said press,
a pair of arms pivotally mounted on said control mechanism,
each of said arms being adapted to extend between a respective pair of upper and lower mold sections,
each of said arms being adjustable in length so as to contact a respective expanding tire band at a predetermined point,
means connecting said control mechanism to said press to interrupt closing of said mold sections at a predetermined point,
means to extend said arms between said respective mold sections after interrupting said closing,
means connecting said control mechanism to said press actuated by each of said arms to stop expansion of one of said tire bands upon contact being made with the respective arm,
the other of said tire bands being permitted to continue to expand until contact is made with its respective arm,
means to maintain expansion of said one tire band and contact with its respective arm during expansion of said other tire band,
means to withdraw said arms from between said respective mold sections only after the stopping of expansion of both of said bands,
and means to resume closing said mold sections after withdrawal of both of said arms.

References Cited in the file of this patent
UNITED STATES PATENTS

| | | |
|---|---|---|
| 2,145,997 | Smith | Feb. 7, 1939 |
| 2,367,642 | Helwig | Jan. 16, 1945 |
| 2,946,088 | Soderquist | July 26, 1960 |